Patented June 12, 1945

2,378,193

UNITED STATES PATENT OFFICE 2,378,193

PAPER AND METHOD OF MANUFACTURING SAME

Arthur B. Cummins, Millington, and Carlton J. O'Neil, Plainfield, N. J., assignors to Johns-Manville Corporation, New York, N. Y., a corporation of New York No Drawing. Application November 14, 1941, Serial No. 419,122

4 Claims. (Cl. 92—21)

This invention relates to paper manufacturing, and particularly to paper in which diatomaceous earth is used in conjunction with well-known opacifying pigments, without loss of opacity and without loss of brightness in the finished paper product. It also relates to the procedure of incorporating diatomaceous earth in the paper furnish in order to improve the retention of the opacifying pigments in the sheeted material during the formation of the paper on the paper machine. It relates further to a diatomaceous earth composition having definite particle size distribution which may suitably be used and adapted in papers in combination with opacifying pigments without loss of opacity or brightness ordinarily obtained from the pigments.

Papers have been manufactured for a long time in which pigments having a high refractive index to light and having good opacity were used to impart suitable brightness and opacity to the sheeted materials. The preferred pigments for these purposes are high refractive index materials such as titanium dioxide, but zinc sulphide and blends of titanium dioxide and zinc sulphide with barium sulphate and calcium sulphate have also been used. Clays and talcs have conveniently been used as fillers in conjunction with titanium dioxide pigments in papers, but the brightness factor of the finished sheet produced by the titanium dioxide in such cases is seriously reduced by the clays or talcs. Pigments such as titanium dioxide are quite expensive, but, inasmuch as no other materials which would impart as good brightness and opacity to the sheet are known, the use of such relatively expensive pigments is often necessary.

The ordinary method of manufacturing paper generally followed is to mix the fibre with the necessary sizing materials, pigments, colors, etc. in a beater. The resulting mixture is then diluted, and the diluted furnish is passed over the web-forming device of the paper machine. At this point, the water-insoluble components are formed into a web, and the water is withdrawn. This water, which is ordinarily referred to as white water, is generally reused in the system or discarded.

Difficulty has, however, been generally experienced in that the pigments have a tendency to pass through the web-forming device into the white paper. Under these circumstances, the sheeted material has generally been deficient in filler materials, unless extra amounts of pigments have been provided, and considerable work has been done in the past in an effort to retain a greater quantity of the pigment in the sheeted web.

It is, therefore, an object of the present invention to add or substitute a suitable diatomaceous earth, as will be described in more detail below, in conjunction with the conventional opacifying pigments, particularly titanium dioxide, to improve the retention of the titanium dioxide in the sheeted web, and particularly the first time it passes over the paper machine wire. As explained above, considerable loss of the valuable pigments has heretofore occurred during the web-forming operation, and it has been found that the particular diatomaceous earth used herein has substantial properties for aiding in the suspension and retention of the opacifying pigments. As a result of these properties, a larger proportion of the opacifying pigments is retained in the sheet. When the diatomaceous earth is used in conjunction with the opacifying pigments, there will be an improved retention of the pigments which may increase the bulk of the sheet depending on the amount and ratio of the diatomaceous earth to other fillers or pigments in the sheet. As a consequence of the retention effect, the ash content of the final product is substantially increased.

An additional object of the present invention is to add to or substitute diatomaceous earth in a paper furnish to extend the opacifying pigments used therein, thus making the quantity of opacifying pigments more effective in the paper product. In using diatomaceous earth in this manner, smaller quantities of the opaque pigments may be used without sacrifice of brightness or opacifying properties in the paper product. It is important that many papers, and especially the high grade papers, have a high brightness factor and good opacity in order to obtain a marketable commodity. Furthermore, it is important that the quantity of opacifying pigments used in the paper be kept at a minimum in order to lower the manufacturing costs of the paper and still retain a high brightness factor and good opacity in the final product. The diatomaceous earth as used herein tends to extend the opacifying pigments in the paper with little or no loss of the brightness factor or the opacifying properties, and inasmuch as the diatomaceous earth is a relatively cheaper product, considerable savings in the manufacturing cost can readily be effected.

Another object of the present invention is to use diatomaceous earth, in conjunction with opacifying pigments, in order to improve the liquid absorptive capacity of the paper. Due to the improved liquid absorptive capacity of the paper, increased quantities of ink will be absorbed, which obviously is an important improvement in many printing operations. Ink printed on paper as described will dry more rapidly, thus decreasing the time ordinarily required for drying operations.

Another object and advantage of using diatomaceous earth in the paper sheet as described herein is that the material is substantially chemically inert and will not adsorb dyes or colors.

Additional objects of the invention will be apparent to those skilled in the art upon using the invention described herein in manufacturing processes.

The diatomaceous earth material as used in the present invention is a very fine product obtained from the treatment of impalpable or air float fines of natural diatomaceous earth products. A convenient method of obtaining these impalpable or air float fines is to heat and air separate natural diatomaceous earth material. The thus-obtained fines are subjected to a calcination treatment in the presence of sodium carbonate or other suitable fluxing materials. The calcination is carried on at about 1800° F. for a period of about one hour in a rotary kiln. The resulting product is a white material of excellent brightness. This material is then subjected to an air separating action and the coarser components are removed, producing a fine material suitable for use in a paper furnish, as will be described in more detail below.

The diatomaceous earth thus obtained is a very fine amorphous material of which substantially 95% or more will pass through a 325 mesh screen. The product has a wet density of about 20 to 24 lbs. per cubic foot and a loose weight density of about 11 to 13 lbs. per cubic foot. It is relatively soft and has only mild abrasive characteristics. It is very white in color and has a brightness factor of 93 to 96% as compared to titanium dioxide between 95% and 97%.

This particular diatomaceous earth has a particle size distribution of substantially the following proportions and sizes:

| | Per cent |
|---|---|
| Coarser than 10 microns | 23 |
| 10 to 4 microns | 54 |
| 4 to 2 microns | 19 |
| Finer than 2 microns | 4 |

The particle size distribution as given may be varied over a somewhat relatively broad range and still be used in paper as described herein without loss of opacity or brightness in the final sheet. It has been found that if the particle size distribution does not exceed the following range:

| | Per cent |
|---|---|
| Coarser than 10 microns | Not less than 14 |
| 10 to 4 microns | Not less than 42 |
| 4 to 2 microns | Not more than 34 |
| Finer than 2 microns | Not more than 10 | satisfactory results will be obtained in the paper product. In any event, it is desirable that particles coarser than 10 microns should not exceed 35%.

The quantity of diatomaceous earth which is added to the furnish is dependent upon the quantity of opacifying pigment in the furnish. If the quantity of opacifying pigments, especially titanium dioxide, in the furnish is less than 2% based on the fibrous materials in the beater (dry weight), it is necessary to add up to 1% of the diatomaceous earth described above based on the fibrous material (dry weight) in the beater. If the quantity of the titanium dioxide exceeds 2%, a substantial proportion of the titanium dioxide may be replaced with the diatomaceous earth. In conventional practice, it is preferable that not more than 2 parts of diatomaceous earth be substituted in place of each one part of titanium dioxide or other opacifying pigments removed.

As an illustration of the quantity of diatomaceous earth which may be used in the furnish in conjunction with the opacifying pigments, the following illustration will be helpful to those skilled in the art:

| Amount of TiO₂ (based on pulp) used alone in furnish | Substitution suggested for equal or better dry brightness or opacity | Resulting TiO₂-diatomaceous earth ratio | |
|---|---|---|---|
| | | TiO₂ | Dia. earth |
| Up to— 2% TiO₂ | Add 1% diatomaceous earth. | 2 | 1 |
| 5% TiO₂ | Substitute 4% diatomaceous earth for 2% TiO₂. | 3 | 4 |
| 10% TiO₂ | Substitute 5 to 10% diatomaceous earth for 5% TiO₂. | 5 | 5 to 10 |

In actual experiments to determine the comparative opacity and brightness of paper filled with opacifying pigments and mixtures of opacifying pigments and diatomaceous earth, the following results were obtained on hand sheets made by conventional laboratory methods:

[Sheets filled with straight TiO₂ vs. equal parts of TiO₂ and diatomaceous earth.]

| Per cent actual filler | Dry opacity | | Dry brightness | |
|---|---|---|---|---|
| | TiO₂ filled | TiO₂ and diatomaceous earth filled | TiO₂ filled | TiO₂ and diatomaceous earth filled |
| Unfilled | 69 | 69 | 75 | 75 |
| 1% | 74 | 72 | 80 | 79.5 |
| 2% | 77 | 75 | 82 | 81.5 |
| 3% | 79 | 77 | 84 | 83 |
| 4% | 81 | 79 | 85 | 84 |
| 5% | 82.5 | 80.5 | 86 | 84.5 |
| 6% | 84 | 82 | 86.5 | 85 |
| 7% | 85 | 83 | 87 | 85.5 |
| 8% | 86 | 84 | 87.5 | 86 |
| 9% | 86.5 | 85 | 88 | 86 |
| 10% | 87 | 85.5 | 88 | 86.5 |

It will be noted from the above table that the addition of a small amount of titanium dioxide produced a large increase in opacity and brightness; as for example, the addition of 1% titanium dioxide filler as an opacifying pigment increased the dry opacity and dry brightness by 5% over that of the unfilled paper. The second per cent of titanium dioxide filler showed a further improvement of 3% in dry opacity and 2% in dry brightness. It will be noted, however, that after 5% titanium dioxide had been added, further 1% additions thereover produced relatively little improvement. Increasing the titanium dioxide content of the sheet from 5% to 10% merely increased the dry opacity by 4.5% and dry brightness by 2%.

It will also be noted from the above table that the titanium dioxide filler content of papers may be reduced without loss of dry opacity and with loss of very little dry brightness, if approximately 2% of diatomaceous earth is added for each one per cent of titanium dioxide removed down to a minimum titanium dioxide content of 2%. For example, the sheet containing 3% titanium dioxide filler had a dry opacity of 79%. An equal dry brightness and dry opacity was obtained by the use of 2% titanium dioxide, plus 2% diatomaceous earth. When 6% of titanium dioxide was added as an opacifying pigment to the sheet, the dry opacity of the product was 84%. The same dry opacity and approximately equal brightness were, however, obtained by the use of 4% titanium dioxide, plus 4% diatomaceous earth.

The above data disclosing the dry brightness and dry opacity of different paper products teach that if no more than two parts by weight of diatomaceous earth are substituted in place of each one part of titanium dioxide or other opacifying pigments removed from the furnish, when the quantity of titanium dioxide in the furnish is more than 2% based on the fibrous material (dry weight) in the beater, substantially equal opacity and/or brightness will be obtained in the finished product. It has, however, been found that in cases where the quantity of opacifying pigments, especially titanium dioxide, in the furnish is less than 2% based on the fibrous material (dry weight) in the beater, it is necessary to add approximately up to 1% of diatomaceous earths to the titanium dioxide in the furnish instead of substituting the diatomaceous earth in place of the opacifying pigment.

The term "brightness of paper," as used herein, is the reflectance at an effective wave length of 456 millimicrons as determined on the General Electric reflection meter (Institute of Paper Chemistry). The term "opacity of paper," as used herein, is the property that determines the degree to which characters printed or written on one side of the sheet are visible on the other side. It can be measured either as contrast ratio or printing opacity. These measurements are not transmission measurements but are ratios designed to approach as closely as possible to actual conditions existing in the reading or printing material. The term "furnish", as used herein, is the component mixture, not including water, in the beater or other stock preparation equipment and including such material as fibres, opacifying pigments, colors, sizes, etc.

Having thus described my invention in rather full detail, it will be understood by those skilled in the art that these details need not be strictly adhered to, but that various changes and modifications will suggest themselves without departing from the scope of my invention as defined by the subjoined claims.

What we claim is:

1. The process of manufacturing paper from an aqueous suspension including fibrous material and 1-5% of the weight of said material of titanium dioxide, which comprises mixing with said suspension 1-10% of the weight of said fibrous material of finely divided diatomaceous earth, and then forming paper from the resulting mixture, said diatomaceous earth being characterized by a brightness factor of 93-96% and having a size classification of not more than 10% finer than 2 microns, not less than 14% nor more than 35% coarser than 10 microns, the balance being between 2 and 10 microns but having not less than 42% between 4 and 10 microns.

2. The process of manufacturing paper from an aqueous suspension including fibrous material and 1-5% of the weight of said material of bright opacifying pigments, which comprises mixing finely divided diatomaceous earth having a brightness factor of 93-96% with said suspension in amounts ranging from ½ to 1 part by weight for each part of opacifying pigment up to 2% by weight of the fiber, and in amount ranging from 1 to 2 parts by weight for each part of opacifying pigment above 2% by weight of the fibrous material, said diatomaceous earth having a size classification of not more than 10% finer than 2 microns, not less than 14% nor more than 35% coarser than 10 microns, the balance being between 2 and 10 microns but having not less than 42% between 4 and 10 microns.

3. The process of manufacturing paper from an aqueous suspension including fibrous material and 1-5% of the weight of said material of titanium dioxide, which comprises mixing finely divided diatomaceous earth having a brightness factor of 93-96% with said suspension in amounts ranging from ½ to 1 part for each part of titanium dioxide up to 2% by weight of the fibrous material, and in amount ranging from 1 to 2 parts for each part of titanium dioxide above 2% of the weight of the fibrous material, said diatomaceous earth having a size classification of not more than 10% finer than 2 microns, not less than 14% nor more than 35% coarser than 10 microns, the balance being between 2 and 10 microns but having not less than 42% between 4 and 10 microns.

4. A paper comprising felted organic fibrous material and 2-10% by weight of said material of substantially equal amounts of titanium dioxide and flux-calcined diatomaceous earth, said diatomaceous earth having a brightness factor of 93-96% and having a particle size classification of not more than 10% finer than 2 microns, not less than 14% nor more than 35% greater than 10 microns, the balance being between 2 and 10 microns but having not less than 42% between 4 and 10 microns.

ARTHUR B. CUMMINS.
CARLTON J. O'NEIL.